United States Patent
Aoki et al.

(10) Patent No.: US 8,306,132 B2
(45) Date of Patent: Nov. 6, 2012

(54) DETECTING APPARATUS, CALCULATING APPARATUS, MEASUREMENT APPARATUS, DETECTING METHOD, CALCULATING METHOD, TRANSMISSION SYSTEM, PROGRAM, AND RECORDING MEDIUM

(75) Inventors: Takafumi Aoki, Miyagi (JP); Takahiro Yamaguchi, Miyagi (JP); Katsuhiko Degawa, Saitama (JP)

(73) Assignee: Advantest Corporation, Tokyo (JP)

( * ) Notice: Subject to any disclaimer, the term of this patent is extended or adjusted under 35 U.S.C. 154(b) by 706 days.

(21) Appl. No.: 12/424,543

(22) Filed: Apr. 16, 2009

(65) Prior Publication Data
US 2010/0266004 A1 Oct. 21, 2010

(51) Int. Cl.
*H04L 27/28* (2006.01)
(52) U.S. Cl. .................. 375/260; 375/326; 375/354
(58) Field of Classification Search ........... 375/316–352
See application file for complete search history.

(56) References Cited

U.S. PATENT DOCUMENTS

| 6,775,321 | B1 * | 8/2004 | Soma et al. ............ 375/226 |
| 6,940,933 | B1 * | 9/2005 | Heinonen et al. ........ 375/354 |
| 2004/0128076 | A1 | 7/2004 | Pupalaikis et al. |
| 2009/0135972 | A1 * | 5/2009 | Tanaka et al. ........... 375/346 |

FOREIGN PATENT DOCUMENTS

| DE | 10291532 | 8/2003 |
| DE | 112005001355 | 5/2007 |
| JP | 2007-240170 | 9/2007 |

OTHER PUBLICATIONS

"Office Action of German Counterpart Application", issued on Jan. 18, 2011, p1-p4, in which the listed references were cited.
K. Takita, T. Aoki, Y. Sasaki, K. Kobayashi, "High-Accuracy Subpixel Image Registration Based on Phase-Only Correlation," IEICE Trans. Fundamentals, vol.E86-A, No. 8 Aug. 2003.

* cited by examiner

*Primary Examiner* — Sam K Ahn
*Assistant Examiner* — Janice Tieu
(74) *Attorney, Agent, or Firm* — Jianq Chyun IP Office

(57) ABSTRACT

Provided is a detection apparatus that detects a phase alignment error between transmission signals transmitted on different channels, comprising a correlation calculating section that calculates a cross-spectrum between the transmission signals based on a result of a measurement of the transmission signals transmitted in the channels; a phase difference calculating section that calculates a phase difference spectrum between the transmission signals based on the cross-spectrum calculated by the correlation calculating section; and a detecting section that detects a difference between transmission times of the transmission signals transmitted on the different channels and a phase offset between the transmission signals, based on the phase difference spectrum calculated by the phase difference calculating section.

8 Claims, 15 Drawing Sheets

DETECTING APPARATUS, CALCULATING APPARATUS, MEASUREMENT APPARATUS, DETECTING METHOD, CALCULATING METHOD, TRANSMISSION SYSTEM, PROGRAM, AND RECORDING MEDIUM

BACKGROUND

1. Technical Field

The present invention relates to a detection apparatus, a calculation apparatus, a measurement apparatus, a detecting method, a calculating method, a transmission system, a program, and a recording medium.

2. Related Art

A broadband signal is sometimes transmitted using a plurality of channels having different frequency bands. If the line length of each channel is different, there is a difference in transmission time for each channel. Furthermore, a difference in phase offset occurs due to the frequency dependency in each channel. As a result, when the signal transmitted by these different channels is reconstructed, there is distortion in the reconstructed signal.

The time difference can be detected by applying a measurement pilot signal to each channel and measuring the amount of time necessary for the pilot signal to be output from each channel. The phase offset can be detected by using the phase of the pilot signal output from each channel and the known phase of the pilot signal. When detecting the time difference and the phase offset independently, however, there is a large error. Furthermore, when using the pilot signal, it is necessary to use additional hardware to generate the pilot signal.

Related background art is disclosed in the documents listed below.
1. Japanese Patent Application Publication No 2007-240170
2. US Patent Application Publication No. 2004/0,128,076 A1
3. K. Takita, T. Aoki, Y. Sasaki, K. Kobayashi, "High-Accuracy Subpixel Image Registration Based on Phase-Only Correlation," IEICE Trans. Fundamentals, Vol. E86-A, No. 8 August 2003.

SUMMARY

Therefore, it is an object of an aspect of the innovations herein to provide a detection apparatus, a calculation apparatus, a measurement apparatus, a detecting method, a calculating method, a transmission system, a program, and a recording medium, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary detection apparatus may include a detection apparatus that detects a phase alignment error between transmission signals transmitted on different channels, comprising a correlation calculating section that calculates a cross spectrum between the transmission signals based on a result of a measurement of the transmission signals transmitted in the channels; a phase difference calculating section that calculates a phase difference spectrum between the transmission signals based on the cross spectrum calculated by the correlation calculating section; and a detecting section that detects a difference between transmission times of the transmission signals transmitted on the different channels and a phase offset between the transmission signals, based on the phase difference spectrum calculated by the phase difference calculating section.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
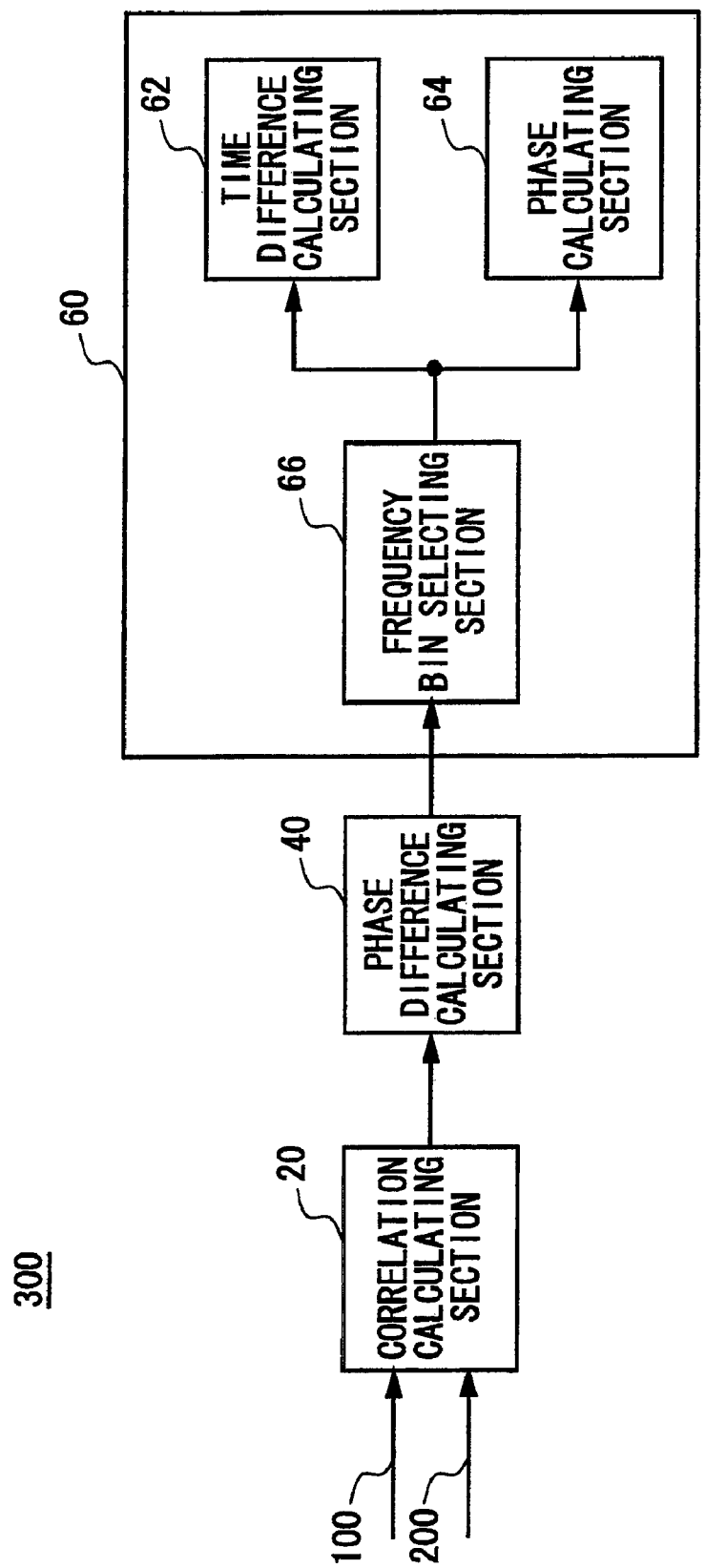
FIG. 1 shows a configuration of a detection apparatus 300 according to a first embodiment of the present invention.

FIG. 1 shows a configuration of a detection apparatus 300 according to a first embodiment of the present invention. The detection apparatus 300 is provided with a correlation calculating section 20, a phase difference calculating section 40, and a detecting section 60. A channel 100 and a channel 200 are connected to the correlation calculating section 20. For example, the channel 100 and the channel 200 each may include a transmission line having a different frequency characteristic. The detection apparatus 300 detects a phase alignment error between transmission signals transmitted on the channel 100 and the channel 200. Here, the phase alignment error refers to an error caused by a time difference and a phase offset occurring between a plurality of signals.

The correlation calculating section 20 calculates a cross spectrum between transmission signals, based on the result of the measurement of each transmission signal transmitted on a corresponding channel. The phase difference calculating section 40 calculates a phase difference spectrum between the transmission signals, based on the cross spectrum calculated by the correlation calculating section 20. The detecting section 60 detects the phase offset between the transmission signals and the transmission time difference of the transmission signal transmitted on each transmission line, based on the phase difference spectrum calculated by the phase difference calculating section 40.

The detecting section 60 includes a time difference calculating section 62, a phase calculating section 64, and a frequency bin selecting section 66. The frequency bin selecting section 66 selects a prescribed number of frequency bin components from the phase difference spectrum. The time difference calculating section 62 calculates the transmission time difference. The phase calculating section 64 calculates the phase offset. The time difference calculating section 62 and the phase calculating section 64 may calculate the time difference and the phase offset by a prescribed calculation process using the frequency bin components selected by the frequency bin selecting section 66.

Figure 2:
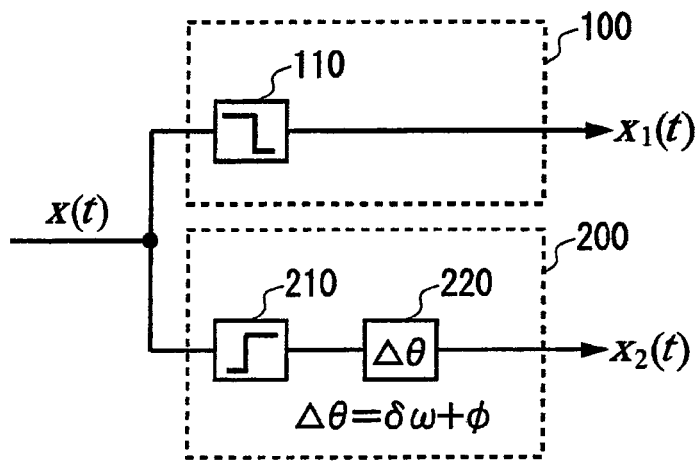
FIG. 2 schematically shows the channel 100 and the channel 200.

FIG. 2 schematically shows the channel 100 and the channel 200. The same signal x(t) is input to the channel 100 and the channel 200. The channel 100 includes a lowpass filter 110. The channel 100 outputs a signal $x_1(t)$ obtained by eliminating a high-frequency component from x(t) via a lowpass filter 110.

The channel 200 includes a highpass filter 210. The channel 200 outputs a signal $x_2(t)$, which has a phase difference $\Delta\theta$ relative to the phase of the channel 100, by removing a low frequency component from the signal x(t). Here, as a model illustrating the objective of the invention, the channel 200 includes a phase difference generating section 220 that applies the phase difference $\Delta\theta$ by adding, to the output signal of the highpass filter 210, (i) a value obtained by multiplying the transmission time difference $\delta$ of the channel 200 relative to the channel 100 by a frequency $\omega$ and (ii) the phase offset $\phi$ between the channels. The objective here is to estimate a non-ideal timing/parameter between a channel including the phase difference generating section 220 and another channel.

The detection apparatus 300 calculates an estimated value of the phase offset $\phi$ and that of the time difference $\delta$ based on $x_1(t)$ and $x_2(t)$. The detection apparatus 300 may reconstruct x(t) based on the calculated time difference $\delta$, the calculated phase offset $\phi$, $x_1(t)$, and $x_2(t)$. For example, the detection apparatus 300 may reconstruct x(t) by using the calculated time difference $\delta$ and phase offset $\phi$ to correct $x_2(t)$, and then combining the corrected $x_2(t)$ with $x_1(t)$.

Figure 3:
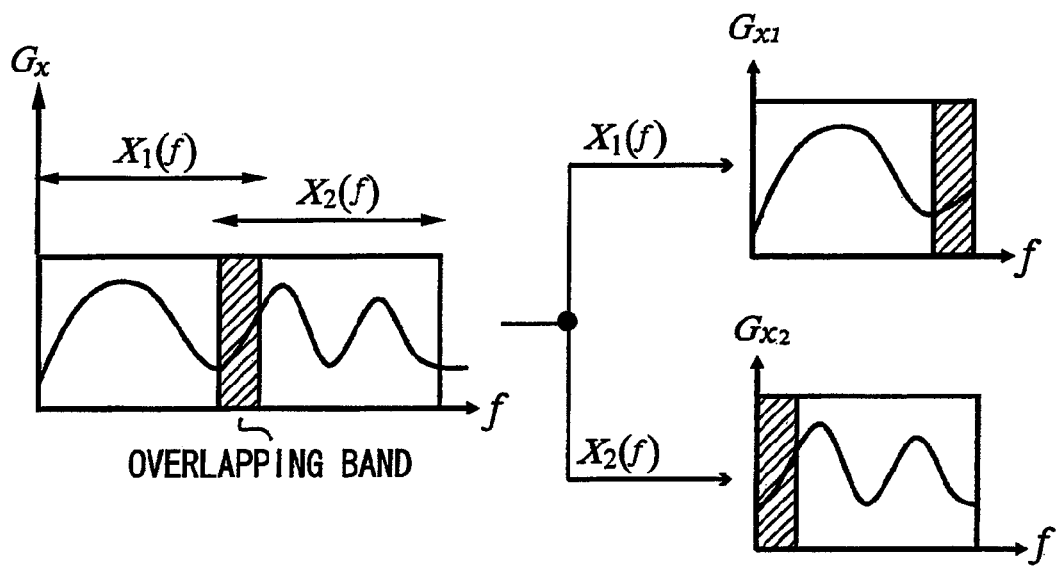
FIG. 3 schematically shows pass frequency bands of the channel 100 and the channel 200.

FIG. 3 schematically shows pass frequency bands of the channel 100 and the channel 200. Here, $X_1(f)$ indicates the frequency spectrum of $x_1(t)$, and $X_2(f)$ indicates the frequency spectrum of $x_2(t)$. The channel 100 passes a frequency component corresponding to $X_1(f)$. The channel 200 passes a frequency component corresponding to $X_2(f)$. A portion of the frequency domain of $X_1(f)$ overlaps with that of $X_2(f)$.

The transmission signals transmitted respectively by the channel 100 and the channel 200 each have substantially the same spectrum at an overlapping prescribed frequency band, and these transmission signals are input respectively to the channel 100 and the channel 200. The same signal x(t) may be input to both the channel 100 and the channel 200. The correlation calculating section 20 receives the transmission signals output by the channel 100 and the channel 200 and calculates the cross spectrum between the transmission signals at the prescribed overlapping frequency.

Here, the transmission signal output by the channel 100 and the transmission signal output by the channel 200 can respectively be modeled by the following expression.

$$x_1[n]=x(nT_s)+n_1[n]$$

$$x_2[n]=x(nT_s-\delta)*e^{-j\phi}+n_2[n] \qquad \text{Expression 1}$$

In Expression 1, $\delta$ represents the transmission time difference between the two channels, $\phi$ represents the phase offset between the two channels, $1/T_s$ represents the sampling frequency, and n represents an integer value. It is assumed that $1/T_s$ is higher than the Nyquist rate of the signal under measurement. Furthermore, $n_1$ and $n_2$ represent noise components that are uncorrelated to each other. The symbol * represents a convolution.

Since the noise $n_1$ and the noise $n_2$ have no correlation with the respective transmission signals $x_1[n]$ and $x_2[n]$, the corresponding cross spectrum is zero. Therefore, the cross spectrum between the transmission signals $x_1[n]$ and $x_2[n]$ can be calculated by the following Expression.

$$G_{x1x2}[k] = G_{x1}[k]G_{x2}^*[k] \qquad \text{Expression 2}$$
$$= G_{xx}[k]e^{j\frac{2\pi}{N}k\delta+j\phi} + G_{n1n2}[k]$$

In Expression 2, $G_{xx}[k]$ represents the power spectrum. Furthermore, $G_{n1n2}[k]$ represents the cross spectrum between the noises $n_1$ and $n_2$, and has a value of zero when there is no correlation between $n_1$ and $n_2$. The coefficient of $G_{xx}[k]$ includes the phase offset $\phi$ and the time difference $\delta$ to be estimated.

Using Expression 2, the phase difference $\Delta\theta$ between the channel 100 and the channel 200 can be calculated by the Expression below.

$$\Delta\theta = \arg\left[\frac{G_{x1x2}[k]}{|G_{x1x2}[k]|}\right] = \frac{2\pi}{N}k\delta + \phi \qquad \text{Expression 3}$$

The phase difference spectrum in Expression 3 is a direct function of the frequency index k of a linear spectrum. The frequency index k is an integer, and the frequency of the linear spectrum increases proportional to the value of k.

When the horizontal axis represents the index k and the vertical axis represents $\Delta\theta$, the direct function shown in FIG. 3 can be expressed as a straight line with a slope of $2\pi\delta/N$ and an intercept at $\phi$. This intercept is the phase difference corresponding to the location at which the straight line corresponding to the direct function crosses the $\Delta\theta$ axis. The time difference calculating section 62 calculates the transmission time difference based on the slope $2\pi\delta/N$ of the phase difference spectrum. The phase calculating section 64 calculates the phase offset based on the intercept point $\phi$ of the phase difference spectrum.

Figure 4:
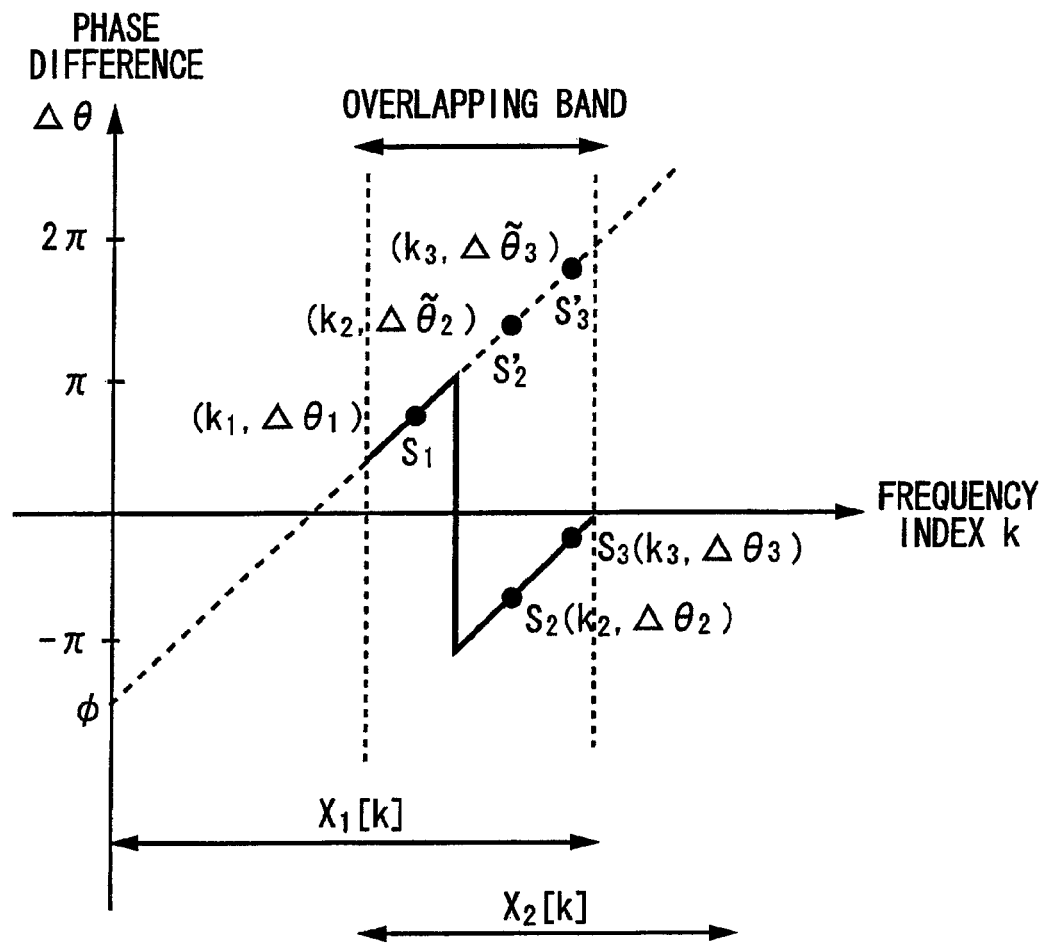
FIG. 4 shows an exemplary phase difference spectrum at an overlapping frequency band.

FIG. 4 shows an exemplary phase difference spectrum at an overlapping frequency band. The frequency band at which the channel 100 and the channel 200 overlap includes phase difference spectra $S_1$, $S_2$, and $S_3$. The frequency indexes and the phase differences of the three phase difference spectra are $(k_1, \Delta\theta_1)$, $(k_2, \Delta\theta_2)$, and $(k_3, \Delta\theta_3)$, respectively. The frequency bin selecting section 66 may select these three frequency bin components from the phase difference spectra in the overlapping frequency band. The time difference calculating section 62 and the phase calculating section 64 calculate the slope and intercept of the phase difference spectra based on linear spectra $S_1$, $S_2$, and $S_3$ corresponding to the three frequency bin components selected by the frequency bin selecting section 66.

Here, the slope of each phase difference spectrum is the slope of the straight line resulting from a linear approximation of the phase difference spectrum. It should be noted that, due to the periodicity of the inverse tangent function, the measured phase difference is expressed using a principle value of a phase range from $-\pi$ to $+\pi$, and is therefore discontinuous at points near a change from $+\pi$ to $-\pi$.

For example, in FIG. 4, the phase difference of the linear spectrum $S_1$ is between 0 and $\pi$, while the phase differences of the linear spectrums $S_2$ and $S_3$, which are at frequencies higher than the frequency of the phase difference spectrum $S_1$, are between $-\pi$ and 0, such that a discontinuous point exists between the phase difference of $S_1$ and the phase difference of $S_2$. As a result, $S_1$, $S_2$, and $S_3$ are not arranged on a single straight line.

Therefore, the time difference calculating section 62 and the phase calculating section 64 detect the phase offset and the transmission time difference based on the slope and the intercept of the phase difference spectra unwrapped by sequentially adding $2\pi$ at prescribed frequencies. More specifically, the time difference calculating section 62 and the phase calculating section 64 generate unwrapped phase difference spectra $S_2'$ and $S_3'$ by adding integer multiples of $2\pi$ to the wrapped phase difference spectra $S_2$ and $S_3$.

The phase difference of each unwrapped phase difference spectrum can be calculated by Expression 4.

$$\Delta\tilde{\theta}_i = \Delta\theta_i + m_i 2\pi \qquad \text{Expression 4}$$

Here, $i$ and $m_i$ are integers. The maximum value of $i$ is equal to the number of phase difference spectra selected by the frequency bin selecting section 66.

Based on Expression 4, the phase differences of the phase difference spectra $S_2'$ and $S_3'$ can be expressed by Expression 5.

$$\Delta\tilde{\theta}_2 = \Delta\theta_2 + m_2 2\pi$$

$$\Delta\tilde{\theta}_3 = \Delta\theta_3 + m_3 2\pi \qquad \text{Expression 5}$$

By using the phase difference spectra $S_1$ and $S_2'$, the slope of the phase difference can be expressed as shown below.

$$\frac{2\pi}{N}\delta = \frac{\Delta\theta_2 - \Delta\theta_1 + m_2 2\pi}{k_2 - k_1} \qquad \text{Expression 6}$$

The time difference $\delta$ can be expressed as shown below.

$$\delta = \frac{N}{2\pi} \cdot \frac{\Delta\theta_2 - \Delta\theta_1 + m_2 2\pi}{k_2 - k_1} \qquad \text{Expression 7}$$

The time difference calculating section 62 can calculate an estimated value of the time difference $\delta$ by obtaining $m_2$ and using Expression 7.

From Expression 3, the phase offset $\phi$ can be expressed as shown below.

$$\phi = \Delta\theta_1 - \frac{2\pi}{N}\delta \times k_1 \qquad \text{Expression 8}$$

The phase calculating section 64 can calculate an estimated value of the phase offset $\phi$ by substituting the time difference $\delta$ calculated by the time difference calculating section 62 into Expression 8.

The time difference calculating section 62 calculates $m_2$ to obtain the time difference $\delta$ and the phase offset $\phi$. More specifically, the time difference calculating section 62 calculates a number of times to add $2\pi$ when unwrapping the phase difference spectrum between two prescribed frequency bins from among the frequency bins selected by the frequency bin selecting section 66, based on three frequency bin components. The time difference calculating section 62 calculates the slope of the phase difference spectrum based on two frequency bin components and the number of times that $2\pi$ is added between these two frequency bins.

More specifically, by using the phase difference spectrum $S_1$ and the unwrapped phase difference spectra $S_2'$ and $S_3'$, the slope of the phase difference spectrum can be expressed as shown below.

$$\frac{\Delta\tilde{\theta}_3 - \Delta\theta_1}{k_3 - k_1} = \frac{\Delta\tilde{\theta}_2 - \Delta\theta_1}{k_2 - k_1} \qquad \text{Expression 9}$$

Expression 10 can be obtained by substituting Expression 5 into Expression 9.

$$(k_3 - k_1)m_2 = C + (k_2 - k_1)m_3 \qquad \text{Expression 10}$$

In expression 10, C is defined as shown below.

$$C = \frac{1}{2\pi}((k_2 - k_1)(\Delta\theta_3 - \Delta\theta_1) - (k_2 - k_1)(\Delta\theta_2 - \Delta\theta_1)) \qquad \text{Expression 11}$$

From Expression 10, it is seen that the term $(k_3-k_1)m_2-C$ is an integer multiple of $k_2-k_1$, and therefore Expression 10 can be rewritten as shown below.

$$(k_3-k_1)m_2 \equiv C (\bmod\ k_2-k_1) \qquad \text{Expression 12}$$

The time difference calculating section 62 can calculate the unknown value $m_2$ by solving Expression 12 using a linear congruence method based on an extended Euclidian algorithm. The time difference calculating section 62 calculates the number of solutions for $d=\gcd((k_3-k_1), (k_2-k_1))$ according to the linear congruence method. If $(k_3-k_1)$ and $(k_2-k_1)$ are coprime, d is equal to 1, and therefore one solution modulo $(k_2-k_1)$ is calculated.

Generally, this solution is $m_2 = m_{2,0} + i(k_2-k_1)/d$ where $i=0, 1, \ldots, d-1$. It should be noted that $m_{2,0} = a(C/d)(\bmod\ k_2-k_1)$ and the integer a is generated by the extended Euclidian algorithm to satisfy the expression $d=a(k_3-k_r)+b(k_2-k_1)$.

The time difference calculating section 62 can calculate the estimated value of the time difference δ by substituting the value of $m_2$ calculated as described above into Expression 7. The phase calculating section 64 can calculate the estimated value of the phase offset φ by substituting the time difference δ calculated by the time difference calculating section 62 into Expression 8.

The time difference calculating section 62 may calculate the time difference by using a least squares method to calculate the slope of the phase difference spectrum. More specifically, the time difference calculating section 62 may calculate the slope of a linear approximation obtained by calculating the number of unwraps, i.e. the number of times 2π is added, of $S_2$ and $S_3$ such that the slopes of the three linear approximations of the unwrapped phase difference spectra $S_2'$ and $S_3'$ are at a minimum value. If at least two phase difference spectra are selected, the slopes of the phase difference spectra can be calculated using the least squares method.

The detection apparatus 300 performs a calculation operation in the frequency domain, using the calculated time difference δ and phase offset φ, to compensate for the phase alignment error of the channel 200 relative to the channel 100. More specifically, the detection apparatus 300 first generates a Fourier spectrum by performing a Fourier transform on the uncompensated signal transmitted on the channel 200. Next, for each frequency bin on which the Fourier transform was performed, the detection apparatus 300 multiplies the Fourier spectrum by a coefficient using the time difference δ and the phase offset φ, to obtain the compensated signal according to the Expression shown below.

$$X_{2c}[k] = e^{+j\frac{2\pi}{N}k\delta+j\phi} X_2[k] \qquad \text{Expression 13}$$

Next, the detection apparatus 300 combines (i) the Fourier spectrum $X_1[k]$ of the signal transmitted on the channel 100 with (ii) the Fourier spectrum $X_{2c}[k]$ of the compensated signal transmitted on the channel 200. Finally, the detection apparatus 300 can reconstruct the waveform by applying a discrete inverse Fourier transform to the combined spectrum.

The detection apparatus 300 can more accurately reconstruct the waveform by using strongly correlated phase difference spectra to calculate the time difference δ and the phase offset φ. Therefore, the frequency bin selecting section 66 desirably selects three frequency bins in sequence beginning with a frequency bin in the phase difference spectrum that has a high signal to noise ratio (SNR).

Assuming that the random noise in the channel 100 and the random noise in the channel 200 follow the same distribution, the signal to noise ratio at each frequency index can be expressed as shown below.

$$SNR[k] = \frac{|\gamma_{x1x2}[k]|}{1-|\gamma_{x1x1}[k]|} \qquad \text{Expression 14}$$

Here, the term $|\gamma_{x1x1}[k]|$ is a complex coherence function and is defined as shown below.

$$|\gamma_{x1x1}[k]| = \frac{|\hat{G}_{x1x2}[k]|}{\sqrt{\hat{G}_{x1x1}[k]\hat{G}_{x2x2}[k]}} \qquad \text{Expression 15}$$

The symbol ˆ represents an average power spectrum estimation obtained using Welch's method. The frequency bin selecting section 66 may use the signal to noise ratio obtained from Expression 14 to select three frequency bins.

As described above, the detection apparatus 300 of the present embodiment uses phase difference spectra in a region of overlapping frequency bands to calculate the phase alignment error between transmission signals transmitted on two different channels. As a result, the time difference and the phase offset can be calculated simultaneously to decrease the error. Furthermore, the detection apparatus 300 can compensate for the phase alignment error between a plurality of channels without using additional hardware to generate a pilot signal, for example.

Figure 5:
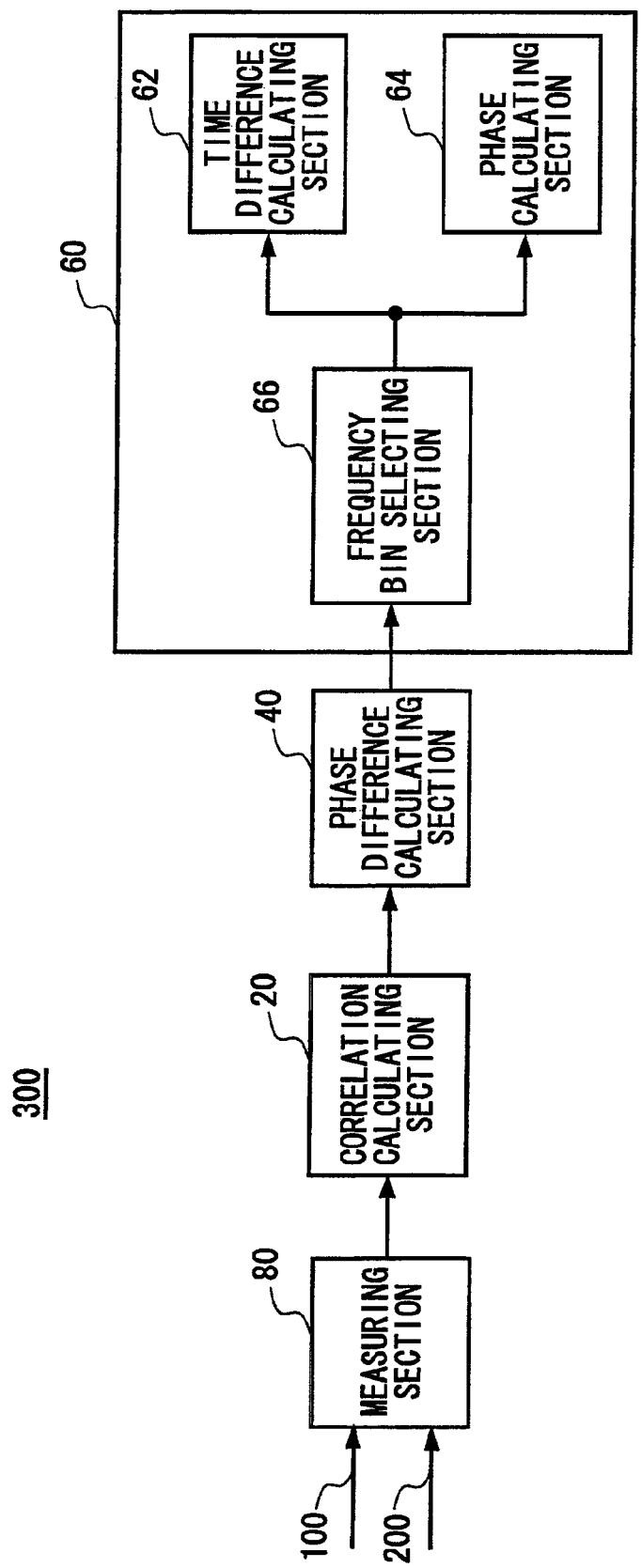
FIG. 5 shows a configuration of the detection apparatus 300 according to a second embodiment of the present invention.

FIG. 5 shows a configuration of the detection apparatus 300 according to a second embodiment of the present invention. The detection apparatus 300 of the present embodiment is provided with a measuring section 80 in addition to the configuration shown in FIG. 1. The measuring section 80 samples the transmission signal transmitted on each channel and performs a Fourier transform on the sampling result of each transmission signal.

The measuring section 80 may simultaneously or sequentially measure a plurality of transmission signals transmitted on the channel 100 and the channel 200.

Figure 6:
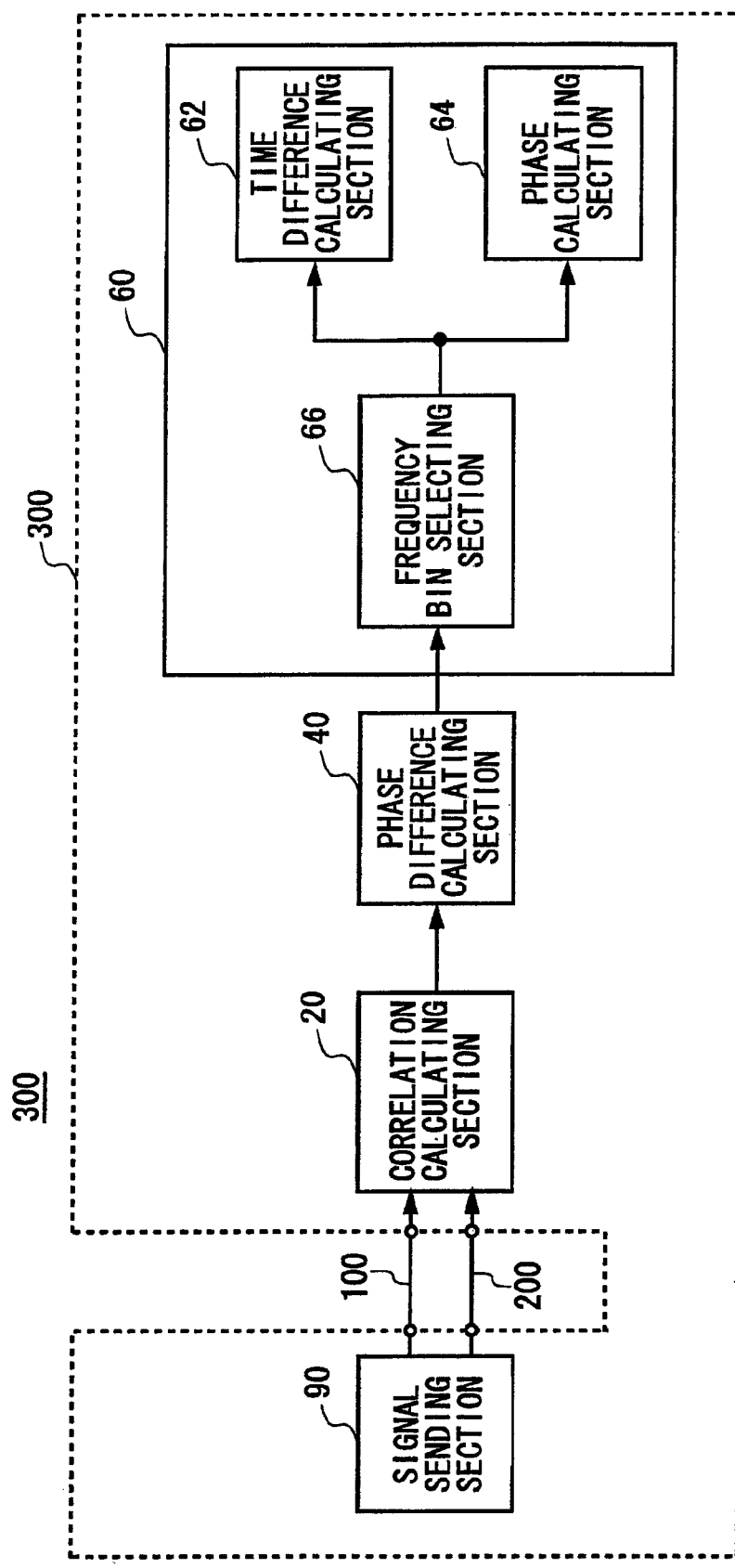
FIG. 6 shows a configuration of the detection apparatus 300 according to a third embodiment of the present invention.

FIG. 6 shows a configuration of the detection apparatus 300 according to a third embodiment of the present invention. The detection apparatus 300 is provided with a signal sending section 90 in addition to the configuration shown in FIG. 1. The signal sending section 90 inputs, to the channel 100 and the channel 200, transmission signals having substantially the same spectrum in the prescribed overlapping frequency band.

The signal sending section 90 may use a lowpass filter and a highpass filter having an overlapping signal-pass frequency to divide a single signal to generate the transmission signals that are input to the channel 100 and the channel 200, respectively. By generating a plurality of transmission signals and inputting these signals into a plurality of channels, the detection apparatus 300 can measure characteristics of the plurality of channels without connecting an apparatus for generating the transmission signals.

Figure 7:
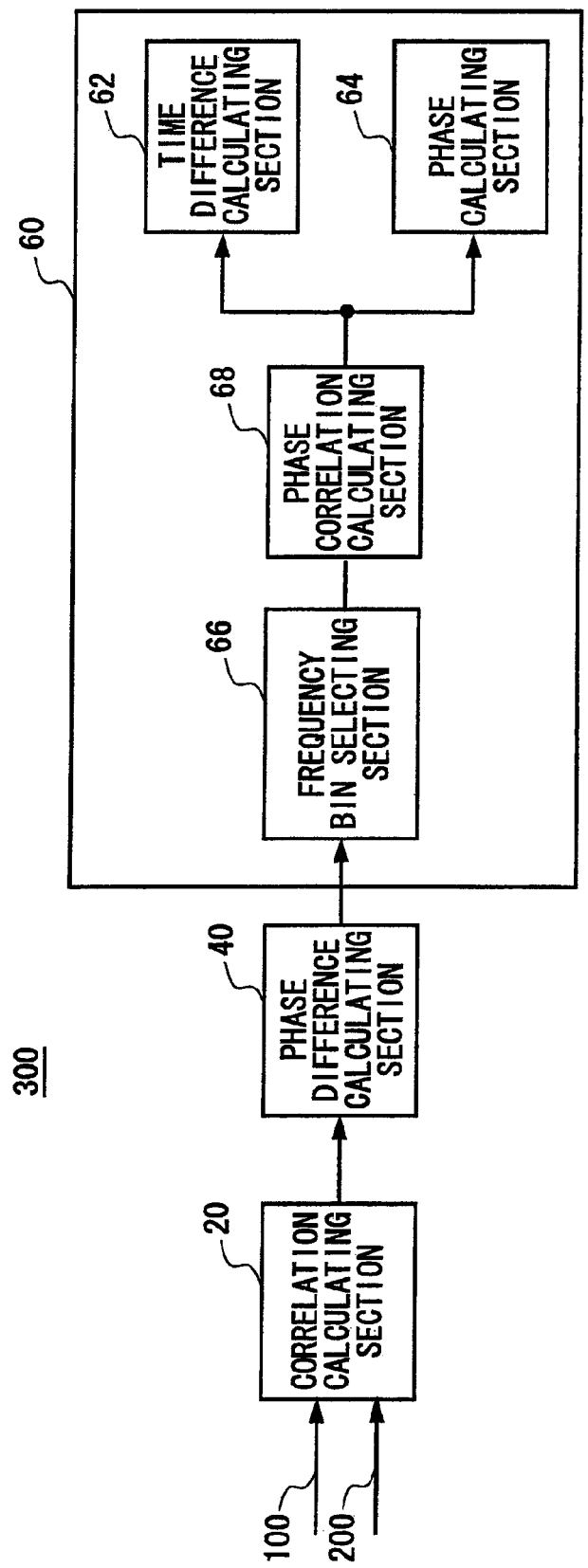
FIG. 7 shows a configuration of the detection apparatus 300 according to a fourth embodiment of the present invention.

FIG. 7 shows a configuration of the detection apparatus 300 according to a fourth embodiment of the present invention. The detecting section 60 in the present embodiment includes a phase correlation calculating section 68 in addition to the configuration shown in FIG. 1. The phase correlation calculating section 68 calculates a phase-only correlation (POC) function obtained as an inverse Fourier transform of the phase difference spectrum. The time difference calculating section 62 calculates the difference in transmission time based on the position of a peak of the POC function. The phase calculating section 64 calculates the intercept of the phase difference spectrum based on the transmission time difference calculated by the time difference calculating section 62, and calculates the phase offset based on the intercept of the phase difference spectrum.

The following describes a technique for calculating the phase offset φ and the time difference δ by using the POC function. The signals transmitted on the channel 100 and the channel 200 are referred to as $x_1[n]$ and $x_2[n]$, respectively, and the Fourier spectra resulting from a Fourier transform of these signals are $X_1[k]$ and $X_2[k]$. The normalized cross-spectrum of $X_1[k]$ and $X_2[k]$ is represented by the Expression below.

$$\hat{R}[k] = \frac{X_1[k]X_2^*[k]}{|X_1[k]X_2^*[k]|} = \exp j(\theta_{x1} - \theta_{x2}) \qquad \text{Expression 16}$$

Here, $\theta_{x1}-\theta_{x2}$ is the phase difference, which is the same in Expression 16 as it is in Expression 3.

The POC function is defined as the inverse Fourier transform of the normalized cross-spectrum, and can be calculated using the Expression below.

$$\hat{r}[n] = \frac{1}{N} \sum_{k=-M}^{M} \hat{R}[k] W_N^{-kn} \qquad \text{Expression 17}$$

If the two signals $x_1[n]$ and $x_2[n]$ are similar to each other, the POC function has sharp peaks such as in a delta function. The height of these peaks can be scaled according to the likelihood of the two signals. The position of the peaks corresponds to the relative time difference $\delta$ between the two signals.

Figure 8A:
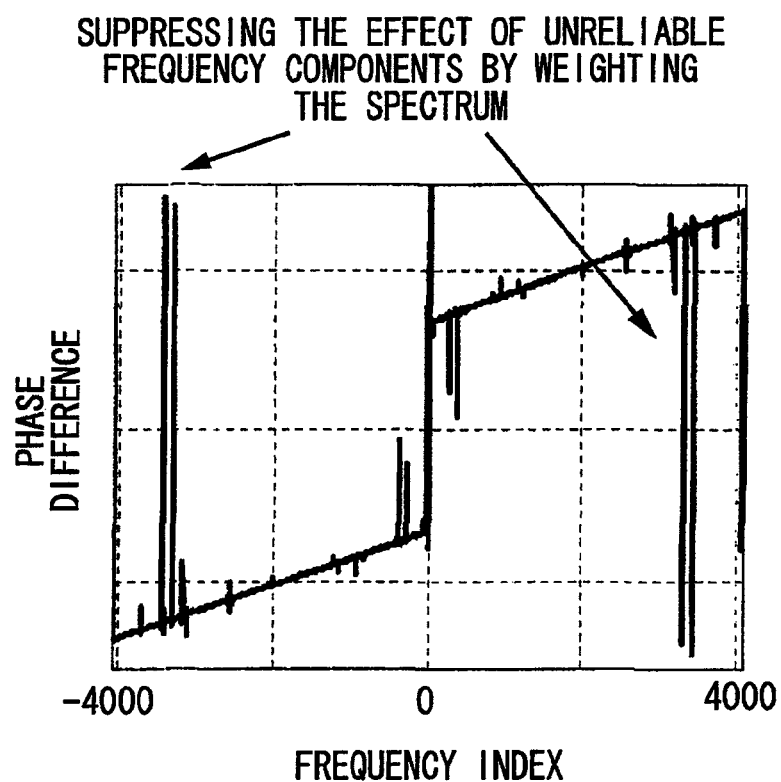
FIG. 8A shows an example, using actual measured data, of a relationship between the frequency index and the phase difference of two signals.
Figure 8B:
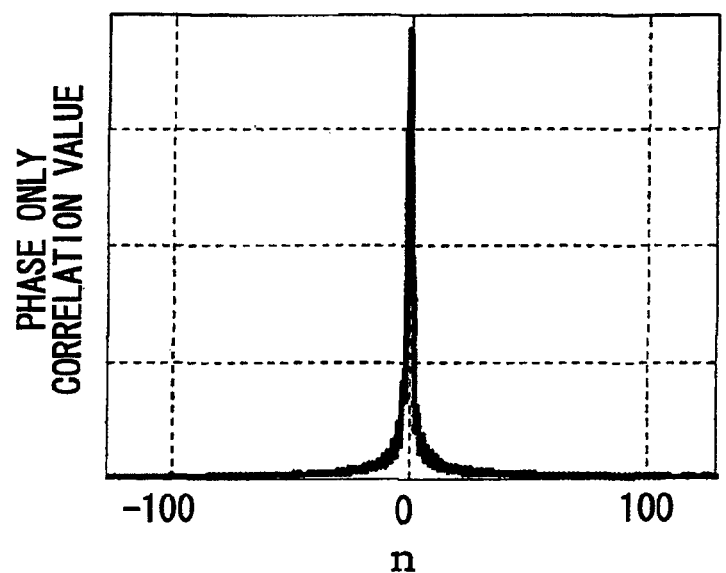
FIG. 8B shows an exemplary phase-only correlation (POC) function between the two signals having the phase difference shown in FIG. 8A.

FIG. 8A shows an example, using actual measured data, of a relationship between the frequency index and the phase difference of two signals. FIG. 8B shows an exemplary POC function between the two signals having the phase difference shown in FIG. 8A. As shown in FIG. 8B, when the two signals are similar, the POC function has a sharp peak.

The detecting section 60 estimates the time difference $\delta$ using the following method. First, the phase correlation calculating section 68 applies a window function to the transmission signals $x_1[n]$ and $x_2[n]$ to prevent cyclical wrapping around of the signals, which is a problem where portions of the signal originally occurring near the end of a finite-duration signal are shifted beyond the end of the duration. By applying the window function, the phase correlation calculating section 68 can lessen the effect of the discontinuity at the edges of the signal periods. The phase correlation calculating section 68 may use a Hanning window as the window function.

Next, the phase correlation calculating section 68 attenuates components at a frequency greater than or equal to a predetermined frequency in the phase difference spectrum, and then performs a Fourier transform. Since the energy of the high frequency components is relatively small, the signal to noise ratio might be degraded since the dispersion has a greater affect. Therefore, the phase correlation calculating section 68 weights the spectrum to suppress the impact of the less reliable high-frequency components, thereby greatly increasing the accuracy of the estimation.

More specifically, when calculating the normalized cross-spectrum represented by Expression 16, the phase correlation calculating section 68 applies a low bandpass spectrum weighting function $H[k]$. The function $H[k]$ may be a quadrature low bandpass function or a Gauss function. For example, the function $H[k]$ may be a low bandpass function such as that shown below.

$$H[k] = \begin{cases} 1 & |k| < U \\ 0 & \text{otherwise,} \end{cases} \qquad \text{Expression 18}$$

When the spectrum weighting is applied, the POC function becomes the Expression below.

$$\hat{r}[n] = \frac{1}{N} \sum_{k=-M}^{M} \hat{R}[k] H[k] W_N^{-kn} \qquad \text{Expression 19}$$

The phase correlation calculating section 68 obtains a POC value by substituting the actual measured data into Expression 19.

Next, the time difference calculating section 62 fits the peak POC value calculated by the phase correlation calculating section 68 to a prescribed model, to estimate a time difference $\delta$ that is less than or equal to the sampling interval. The phase calculating section 64 estimates the phase offset $\phi$ by substituting the time difference $\delta$ estimated by the time difference calculating section 62 into Expression 8.

The time difference calculating section 62 may perform the fitting by comparing the correlation peak of the POC function to a prescribed peak evaluation formula (PEF). For example, the time difference calculating section 62 may use the PEF shown below, which is derived from an approximation of the area around the correlation peak when the quadrature low bandpass spectrum weighting is applied.

$$\delta = \frac{2p\cos\left(\frac{V}{N}\pi\right) \cdot \hat{r}[p] - (p-d)\hat{r}[p-d] - (p+d)\hat{r}[p+d]}{\hat{r}[p-d] - \hat{r}[p+d] - 2\cos\left(\frac{V}{N}\pi\right) \cdot \hat{r}[p]} \qquad \text{Expression 20}$$

The time difference calculating section 62 uses a total of three points for Expression 20: a peak proximity point n=p of the POC function and two points n=p+d and n=p−d separated from the peak proximity point by ±d, where d is a natural number. In Expression 20, N is the number of data points, V=2U+1, and V/N represents the bandwidth of the spectrum weighting function H[k].

In order to increase the accuracy of the estimations for the time distance $\delta$ and the phase offset $\phi$, the detecting section 60 may eliminate frequency bin components having a low signal to noise ratio from the input phase difference spectrum. In other words, the detecting section 60 may select a phase difference spectrum having a high signal to noise ratio and use the selected phase difference spectra to calculate the normalized cross-spectrum.

Figure 9:
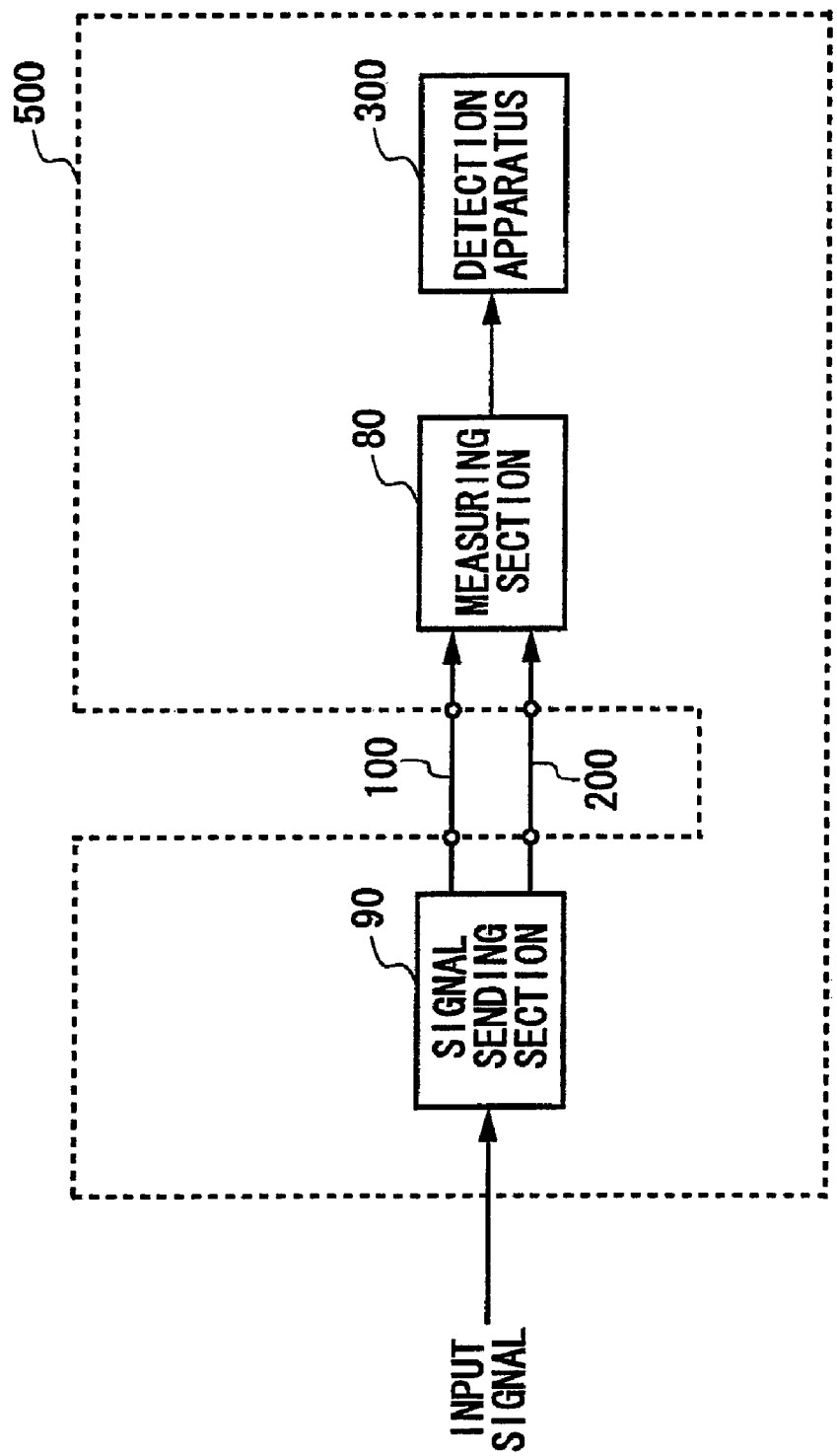
FIG. 9 shows a configuration of a transmission system 500 according to a fifth embodiment of the present invention.

FIG. 9 shows a configuration of a transmission system 500 according to a fifth embodiment of the present invention. The transmission system 500 divides the bandwidth of the signal to be transmitted and sends the resulting divided signals via a plurality of channels, e.g. the channel 100 and the channel 200. The transmission system 500 includes the measuring section 80, the signal sending section 90, and the detection apparatus 300.

The signal sending section 90 divides the signal to be transmitted into a plurality of transmission signals having different bandwidths that partially overlap with each other, and inputs each of these transmission signals into the corresponding channel 100 or 200. The measuring section 80 measures the transmission signal transmitted on each of the channels 100 and 200. The detection apparatus 300 detects the phase alignment error between the transmission signals measured by the measuring section 80. The transmission system 500 may output a transmission signal that is corrected based on the detected error.

In this way, even when serving as a component in the transmission system 500, the detection apparatus 300 can detect the time difference and the phase offset between the transmission signals transmitted respectively on the channel 100 and the channel 200, in the same manner as in the other embodiments.

Figure 10:
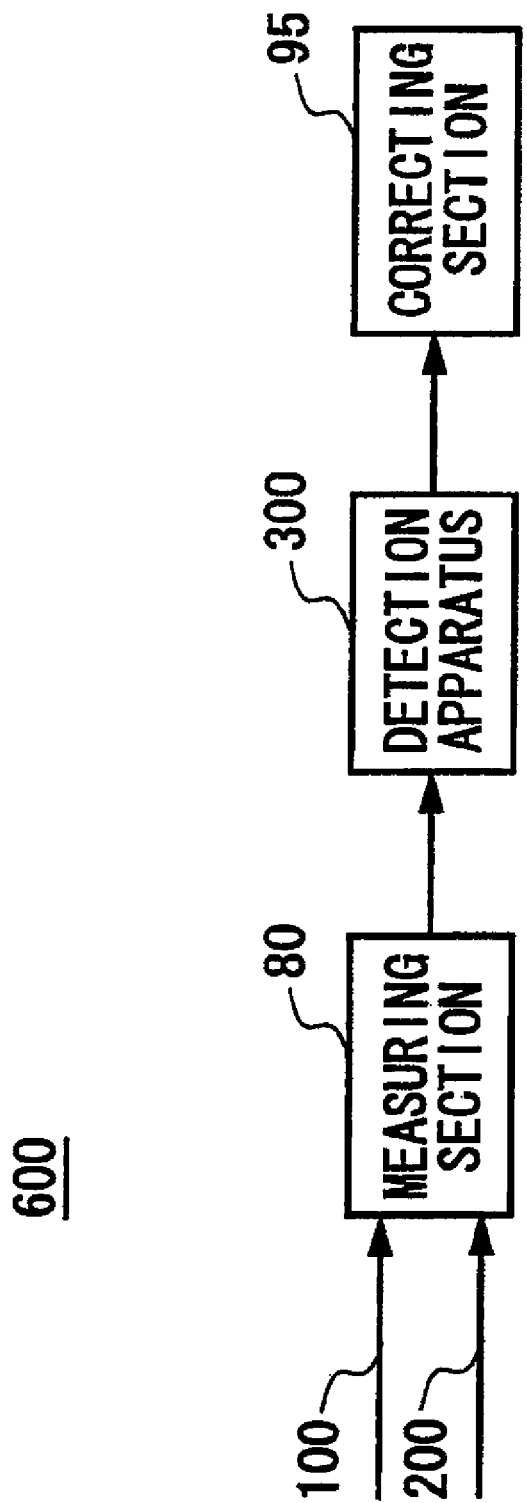
FIG. 10 shows a configuration of a measurement apparatus 600 according to a sixth embodiment of the present invention.

FIG. 10 shows a configuration of a measurement apparatus 600 according to a sixth embodiment of the present invention. The measurement apparatus 600 measures transmission signals transmitted on different channels, e.g. the channel 100 and the channel 200. The measurement apparatus 600 includes the measuring section 80, the detection apparatus 300, and a correcting section 95.

The measuring section 80 measures each transmission signal. The measuring section 80 measures a characteristic of a signal by performing signal processing on the transmission signals after the signals are converted to a digital format. The detection apparatus 300 detects the phase alignment error between the transmission signals. The detection apparatus 300 may measure the time difference and the phase offset between the signal transmitted on the channel 100 and the signal transmitted on the channel 200.

The measuring section 80 may include a plurality of AD converters corresponding one-to-one with the plurality of channels. Each AD converter may detect an amplitude level and output the amplitude level and the time at which the amplitude level crossing was detected, i.e. the detection timing. At this time, the AD converter outputs data having sample points that are arranged nonuniformly over time. Therefore, an interpolation process is performed to convert the nonuniform data sample points into sample points arranged uniformly over time.

The correcting section 95 corrects the measurement results of the measuring section 80 based on the phase alignment error detected by the detection apparatus 300. For example, the correcting section 95 may correct the time difference and the phase offset in the measurement result for the signal transmitted on the channel 200. Instead, the correcting section 95 may reconfigure the measurement results of the transmission signal before the signal was divided between the channel 100 and the channel 200, based on the corrected measurement result of the signal transmitted on the channel 200 and the measurement result of the signal transmitted on the channel 100.

Figure 11:
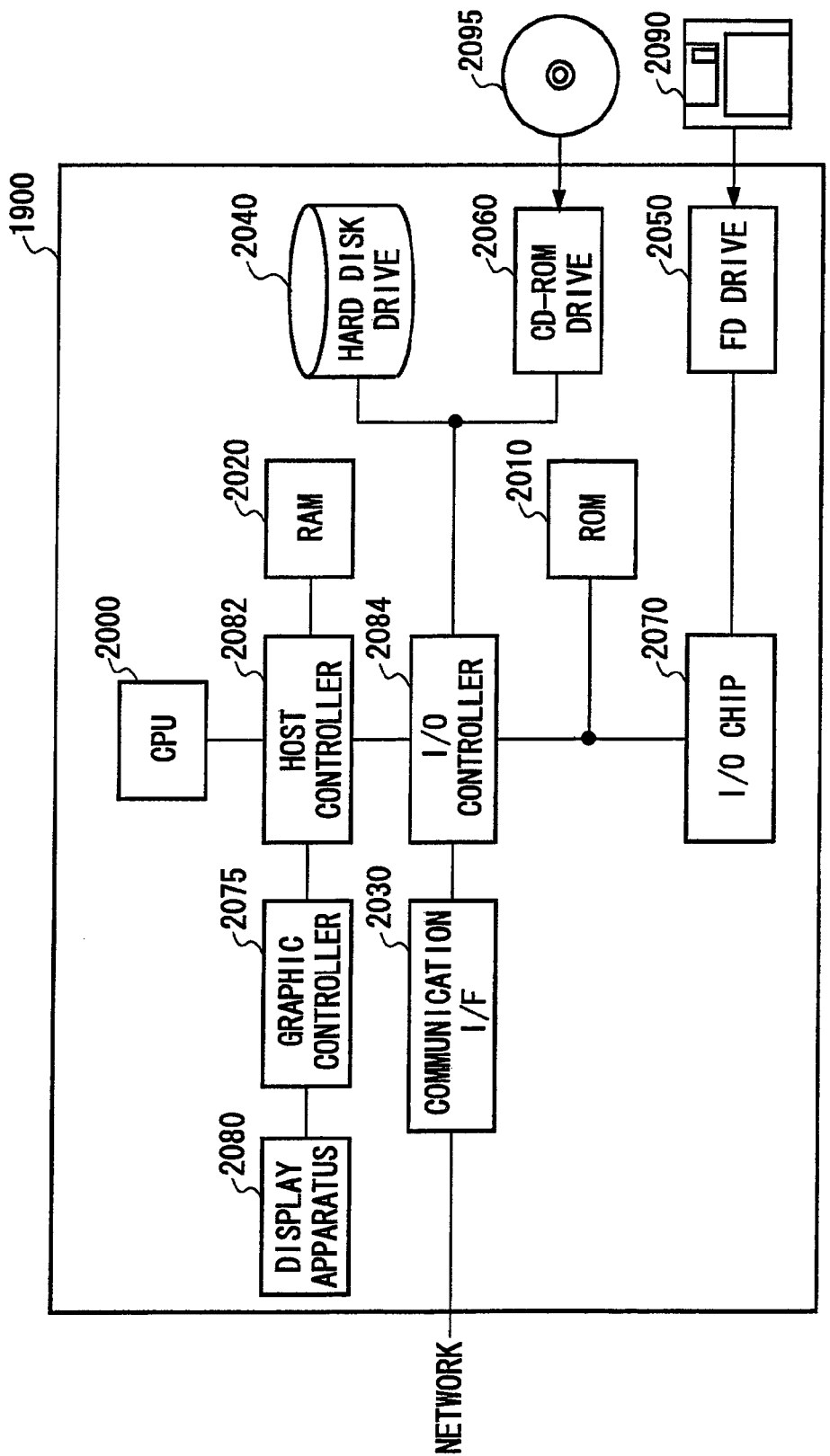
FIG. 11 shows an example of a hardware configuration of a computer 1900 serving as the detection apparatus 300 according to a seventh embodiment of the present invention.
Figure 12:
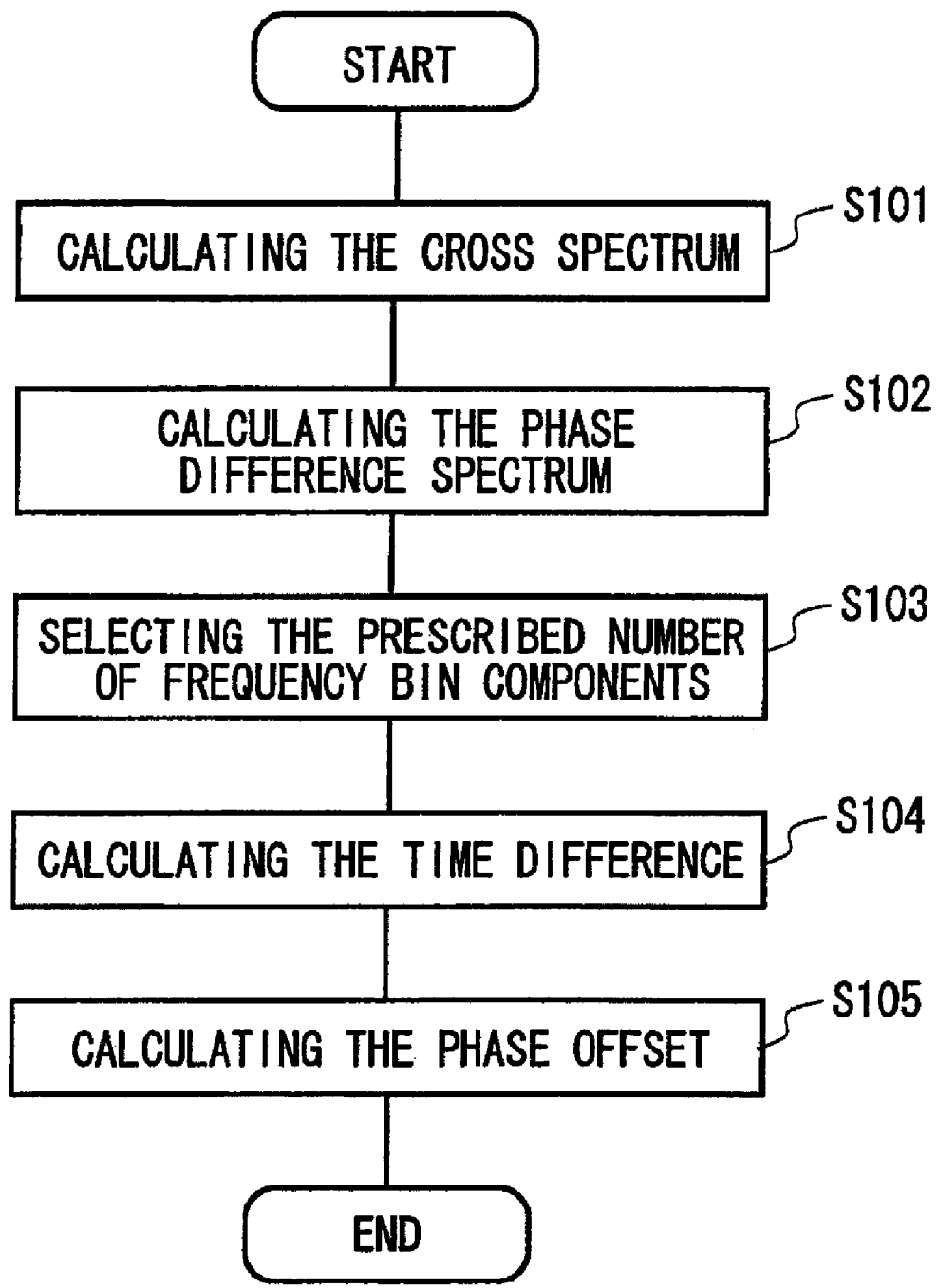
FIG. 12 is a flow chart showing an exemplary operation of the detection apparatus 300 according to the present embodiment.

FIG. 11 shows an example of a hardware configuration of a computer 1900 serving as the detection apparatus 300 according to a seventh embodiment of the present invention. FIG. 12 is a flow chart showing an exemplary operation of the detection apparatus 300 according to the present embodiment. The computer 1900 according to the present embodiment is provided with a CPU peripheral including a CPU 2000, a RAM 2020, a graphic controller 2075, and a display apparatus 2080, all of which are connected to each other by a host controller 2082; an input/output section including a communication interface 2030, a measurement interface 2032, a hard disk drive 2040, and a CD-ROM drive 2060, all of which are connected to the host controller 2082 by an input/output controller 2084; and a legacy input/output section including a ROM 2010, a flexible disk drive 2050, and an input/output chip 2070, all of which are connected to the input/output controller 2084.

The host controller 2082 is connected to the RAM 2020 and is also connected to the CPU 2000 and graphic controller 2075 accessing the RAM 2020 at a high transfer rate. The CPU 2000 operates to control each section based on programs stored in the ROM 2010 and the RAM 2020. The graphic controller 2075 acquires image data generated by the CPU 2000 or the like on a frame buffer disposed inside the RAM 2020 and displays the image data in the display apparatus 2080. In addition, the graphic controller 2075 may internally include the frame buffer storing the image data generated by the CPU 2000 or the like.

The input/output controller 2084 connects the communication interface 2030 serving as a relatively high speed input/output apparatus, and the hard disk drive 2040, and the CD-ROM drive 2060 to the host controller 2082. The communication interface 2030 communicates with other apparatuses via a network. The hard disk drive 2040 stores the programs and data used by the CPU 2000 housed in the computer 1900. The CD-ROM drive 2060 reads the programs and data from a CD-ROM 2095 and provides the read information to the hard disk drive 2040 via the RAM 2020.

Furthermore, the input/output controller 2084 is connected to the ROM 2010, and is also connected to the flexible disk drive 2050 and the input/output chip 2070 serving as a relatively high speed input/output apparatus. The ROM 2010 stores a boot program performed when the computer 1900 starts up, a program relying on the hardware of the computer 1900, and the like. The flexible disk drive 2050 reads programs or data from a flexible disk 2090 and supplies the read information to the hard disk drive 2040 via the RAM 2020. The input/output chip 2070 connects the flexible disk drive 2050 to the input/output controller 2084 along with each of the input/output apparatuses via, a parallel port, a serial port, a keyboard port, a mouse port, or the like.

The programs provided to the hard disk drive 2040 via the RAM 2020 are stored in a storage medium, such as the flexible disk 2090, the CD-ROM 2095, or an IC card, and provided by a user. The programs are read from storage medium, installed in the hard disk drive 2040 inside the computer 1900 via the RAM 2020, and performed by the CPU 2000.

The programs installed in the computer 1900 to make the computer 1900 function as the detection apparatus 300 cause the computer 1900 to function as the (i) the correlation calculating section 20 that, at S101, calculates a cross spectrum between transmission signals based on measurement results of transmission signals transmitted on a plurality of channels, (ii) the phase difference calculating section 40 that, at S102, calculates a phase difference spectrum between the transmission signals based on the cross spectrum calculated by the correlation calculating section 20, and (iii) the detecting section 60 that detects the difference in transmission time between the channels transmitting the respective transmission signals and the phase offset between the transmission signals, based on the phase difference spectrum calculated by the phase difference calculating section 40.

Furthermore, the programs cause the computer 1900 to function as (i) the frequency bin selecting section 66 that, at S103, selects three frequency bin components in the phase difference spectrum, (ii) the time difference calculating section 62 that calculates the slope of the phase difference spectrum based on the three frequency bin components selected by the frequency bin selecting section 66 and, at S104, calculates the difference in transmission time based on the calculated slope of the phase difference spectrum, and (iii) the phase calculating section 64 that calculates the intercept of the phase difference spectrum based on the three frequency bin components selected by the frequency bin selecting section 66 and, at S105, calculates phase offset based on the calculated intercept of the phase difference spectrum.

The information processes recorded in these programs are read by the computer 1900 to cause the computer 1900 to function as software and hardware described above, which are exemplified by the specific sections of the correlation calculating section 20, the phase difference calculating section 40, the detecting section 60, the frequency bin selecting section 66, the time difference calculating section 62, and the phase calculating section 64. With these specific sections, a unique detection apparatus 300 suitable for an intended use can be configured by realizing the calculations or computations appropriate for the intended use of the computer 1900 of the present embodiment.

For example, if there is communication between the computer 1900 and an external apparatus or the like, the CPU 2000 performs the communication program loaded in the RAM 2020, and provides the communication interface 2030 with communication processing instructions based on the content of the process recorded in the communication program. The communication interface 2030 is controlled by the CPU 2000 to read the transmission data stored in the transmission buffer area or the like on the storage apparatus, such as the RAM 2020, the hard disc 2040, the flexible disk 2090, or the CD-ROM 2095, and send this transmission data to the network, and to write data received from the network onto a reception buffer area on the storage apparatus. In this way, the communication interface 2030 may transmit data to and from the storage apparatus through DMA (Direct Memory Access). As another possibility, the CPU 2000 may transmit the data by reading the data from the storage apparatus or communication interface 2030 that are the origins of the transmitted data, and writing the data onto the communication interface 2030 or the storage apparatus that are the transmission destinations.

The CPU 2000 may perform various processes on the data in the RAM 2020 by reading into the RAM 2020, through DMA transmission or the like, all or a necessary portion of the database or files stored in the external apparatus such as the hard disk 2040, the CD-ROM drive 2060, the CD-ROM 2095, the flexible disk drive 2050, or the flexible disk 2090. The CPU 2000 writes the processed data back to the external apparatus through DMA transmission or the like.

In this process, the RAM 2020 is considered to be a section that temporarily stores the content of the external storage apparatus, and therefore the RAM 2020, the external apparatus, and the like in the present embodiment are referred to, as a memory, a storage section, and a storage apparatus. The variety of information in the present embodiment, such as the variety of programs, data, tables, databases, and the like are stored on the storage apparatus to become the target of the information processing. The CPU 2000 can hold a portion of the RAM 2020 in a cache memory and read from or write to the cache memory. With such a configuration as well, the cache memory serves part of the function of the RAM 2020, and therefore the cache memory is also included with the RAM 2020, the memory, and/or the storage apparatus in the present invention, except when a distinction is made.

The CPU 2000 executes the various processes such as the computation, information processing, condition judgment, searching for/replacing information, and the like included in the present embodiment for the data read from the RAM 2020, as designated by the command sequence of the program, and writes the result back onto the RAM 2020. For example, when performing condition judgment, the CPU 2000 judges whether a variable of any type shown in the present embodiment fulfills a condition of being greater than, less than, no greater than, no less than, or equal to another variable or constant. If the condition is fulfilled, or unfulfilled, depending on the circumstances, the CPU 2000 branches into a different command sequence or acquires a subroutine.

The CPU 2000 can search for information stored in a file in the storage apparatus, the database, and the like. For example, if a plurality of entries associated respectively with a first type of value and a second type of value are stored in the storage apparatus, the CPU 2000 can search for entries fulfilling a condition designated by the first type of value from among the plurality of entries stored in the storage apparatus. The CPU 2000 can then obtain the second type of value associated with the first type of value fulfilling the prescribed condition by reading the second type of value stored at the same entry.

The programs and modules shown above may also be stored in an external storage medium. The flexible disk 2090, the CD-ROM 2095, an optical storage medium such as a DVD or CD, a magneto-optical storage medium, a tape medium, a semiconductor memory such as an IC card, or the like can be used as the storage medium. Furthermore, a storage apparatus such as a hard disk or RAM that is provided with a server system connected to the Internet or a specialized communication network may be used to provide the programs to the computer 1900 via the network.

Figure 13:
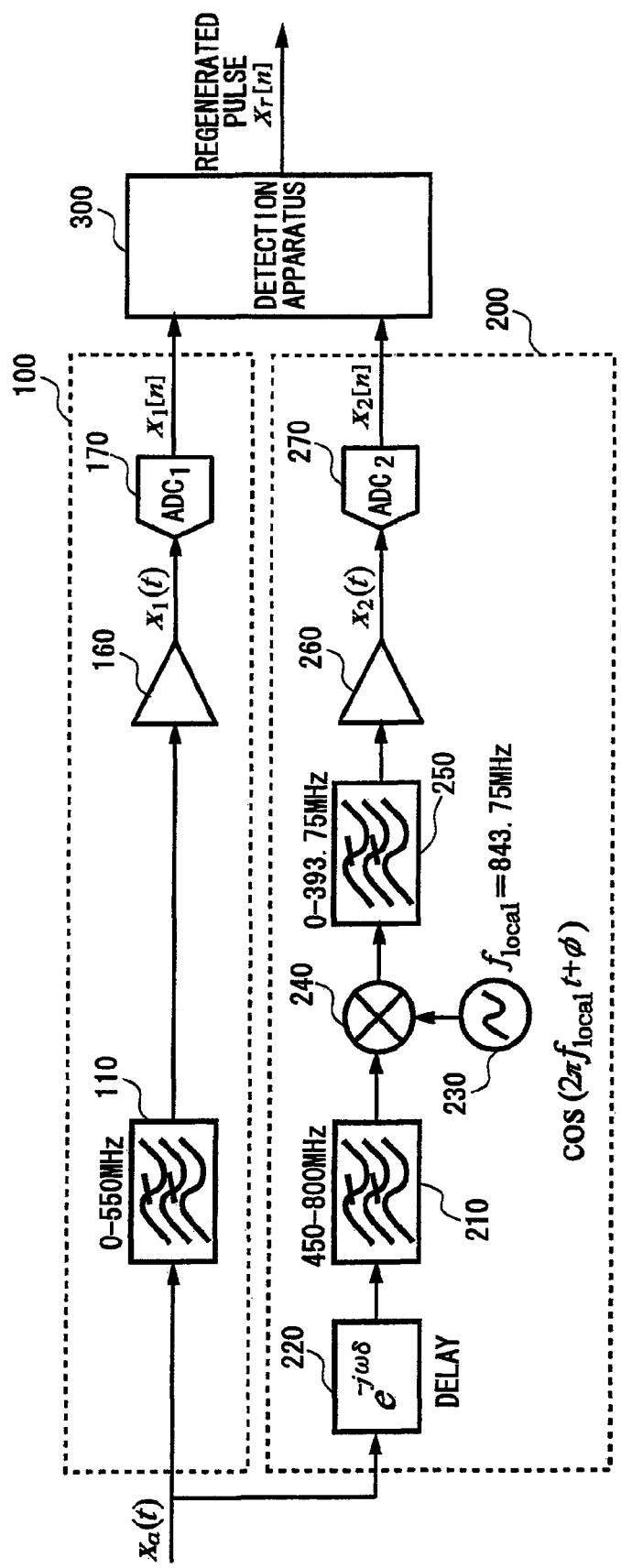
FIG. 13 shows an example of a plurality of channels having an overlapping frequency band.

The following uses FIGS. 13 to 16B to describe actual test results obtained using the embodiments described above. FIG. 13 shows an example of a plurality of channels having an overlapping frequency band. The channel 100 includes a lowpass filter 110, a buffer 160, and an AD converter 170. The channel 200 includes a highpass filter 210, a local oscillator 230, a mixer 240, a lowpass filter 250, a buffer 260, and an AD converter 270.

The same input signal $x_a(t)$ is input to both the channel 100 and the channel 200. The input signal $x_a(t)$ is a broadband signal generated by gating a 503.90625 MHz sinusoidal wave with a pulse having a pulse width of 30 ns and a repeating frequency of 5.859375 MHz. FIG. 13 focuses on finding the time difference $\delta$ of the phase difference generating section 220 and the phase offset $\phi$ of the local oscillator 230, which are the non-ideal timing parameters between the channels.

The lowpass filter 110 passes a signal that is less than or equal to 550 MHz. The buffer 160 amplifies the signal passed by the lowpass filter 110. The AD converter 170 samples the signal $x_1(t)$ output by the buffer 160, at prescribed sampling periods, to generate a discrete digital signal $x_1[n]$.

The highpass filter 210 passes a signal between 450 MHz and 800 MHz. Together, the lowpass filter 110 and the highpass filter 210 pass a signal with a frequency between 450 MHz and 550 MHz.

The local oscillator 230 generates a clock for down conversion. The mixer 240 down converts the intermediate-frequency signal output by the highpass filter 210 by multiplying (i) the signal output by the phase difference generating section 220 and delayed by the time difference $\delta$ and (ii) the oscillation of the phase offset $\phi$ output by the local oscillator 230. The lowpass filter 250 only passes frequency components less than or equal to 393.75 MHz, thereby eliminating the high frequency signal from the output signal of the mixer 240. The AD converter 270 samples the signal $x_2(t)$ output by the buffer 260, at prescribed sampling periods, to generate a discrete digital signal $x_2[n]$.

Figure 14A:
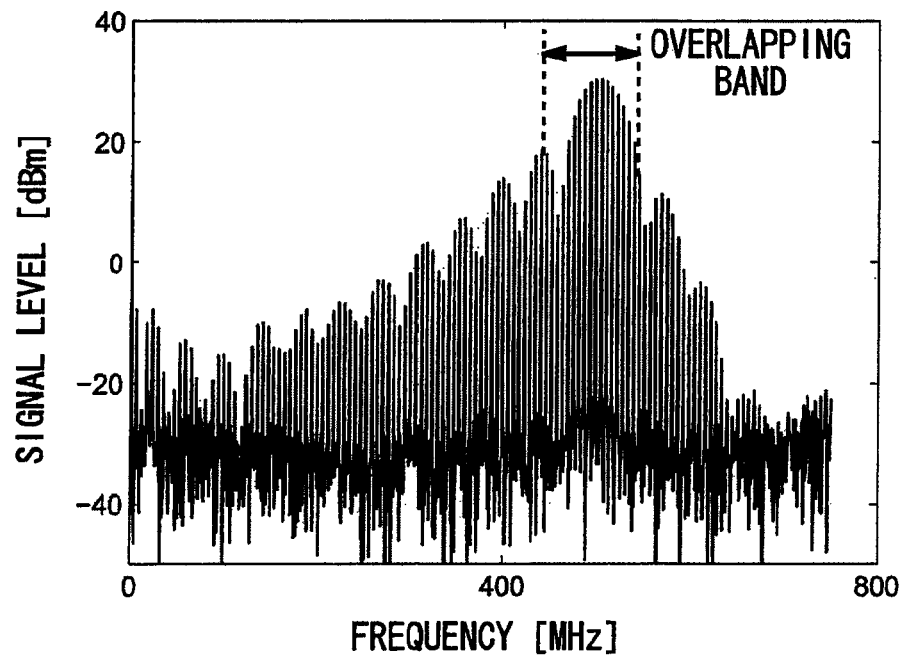
FIG. 14A shows a signal spectrum obtained by applying a Fourier transform to the signal $x_1[n]$ output by the AD converter 170.
Figure 14B:
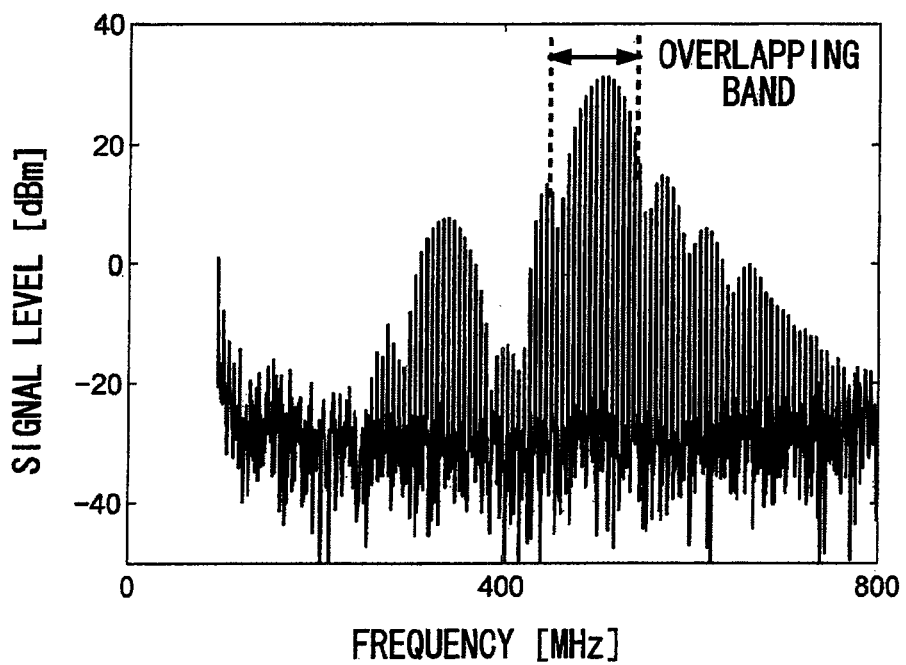
FIG. 14B shows the signal spectrum of the signal $x_2[n]$ output by the AD converter 270.

FIG. 14A shows a signal spectrum obtained by performing a Fourier transform on the signal $x_1[n]$ output by the AD converter 170. FIG. 14B shows the signal spectrum of the signal $x_2[n]$ output by the AD converter 270. At frequencies between 450 MHz and 550 MHz, it can be seen that the spectrum shown in FIG. 14A and the spectrum shown in FIG. 14B are the same.

The signals $x_1[n]$ and $x_2[n]$ are input to the detection apparatus 300. The detection apparatus 300 uses the process described above to calculate the phase difference spectrum between $x_1[n]$ and $x_2[n]$, and to then calculate estimated values for the time difference $\delta$ and the phase offset $\phi$ between the transmission signals.

Figure 15A:
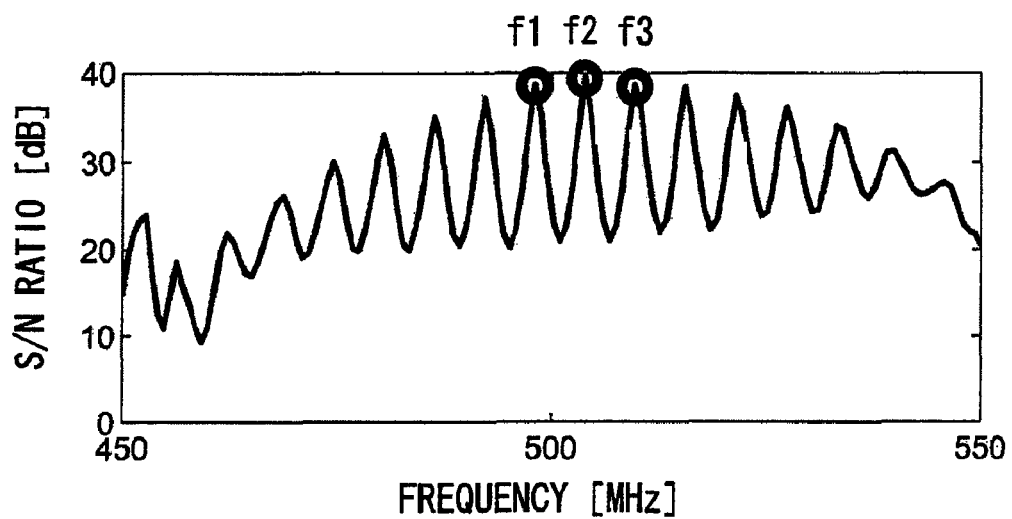
FIG. 15A shows the signal to noise ratio of each frequency component in the frequency band from 450 MHz to 550 MHz, over which the spectra shown in FIGS. 14A and 14B overlap.

FIG. 15A shows the signal-to-noise ratio of each frequency component in the frequency band from 450 MHz to 550 MHz, over which the spectra shown in FIGS. 14A and 14B overlap. The detection apparatus 300 may select the three linear spectra f1, f2, and f3, which have the largest signal to noise ratio. In the present embodiment, f1 is 498.7793 MHz, f2 is 504.6387 MHz, and f3 is 510.4980 MHz.

Figure 15B:
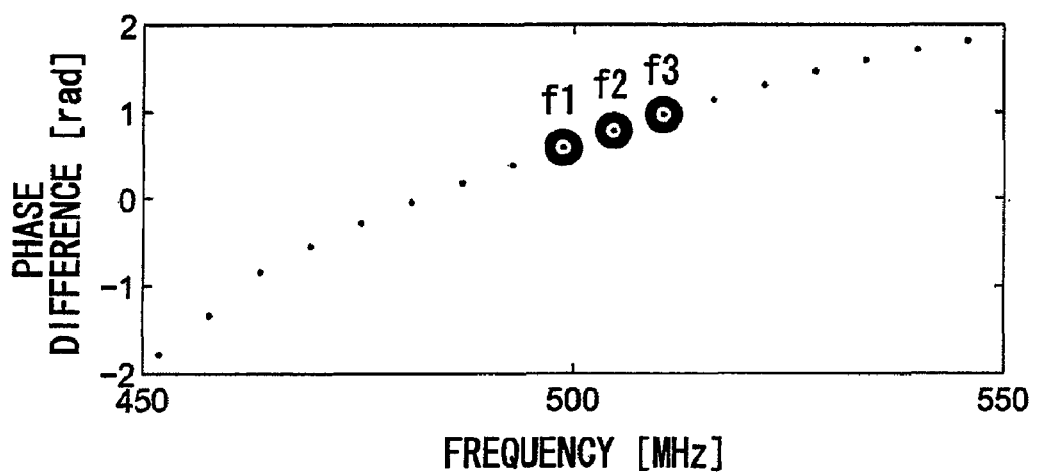
FIG. 15B shows the phase difference between the linear spectra shown in FIG. 15A.

FIG. 15B shows the phase difference between the linear spectra shown in FIG. 15A. The detection apparatus 300 can calculate the values of the time difference $\delta$ and the phase offset $\phi$ by calculating the slope and intercept of the straight line obtained from the phase difference spectrum including the three linear spectra f1, f2, and f3 that are selected based on FIG. 15A. The detection apparatus 300 reconfigures $x_1[n]$ and $x_2[n]$ after using the calculated time difference $\delta$ and phase offset $\phi$ to correct $x_2[n]$. The detection apparatus 300 can reconfigure a signal that is substantially the same as the input signal $x_a(t)$ by performing an analog conversion on the reconfigured spectrum.

Figure 16A:
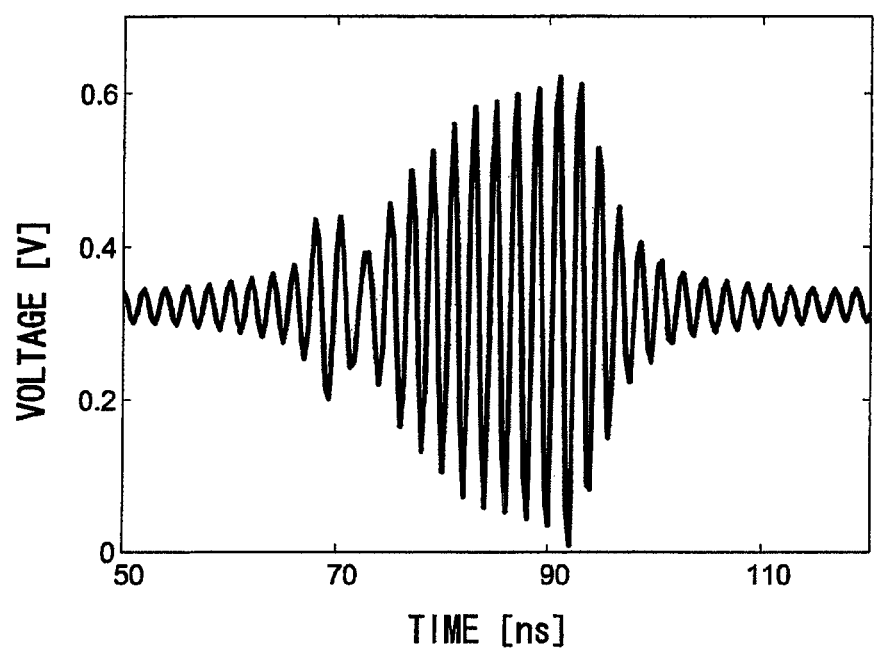
FIG. 16A shows a signal that is reconfigured without performing the correction beforehand.
Figure 16B:
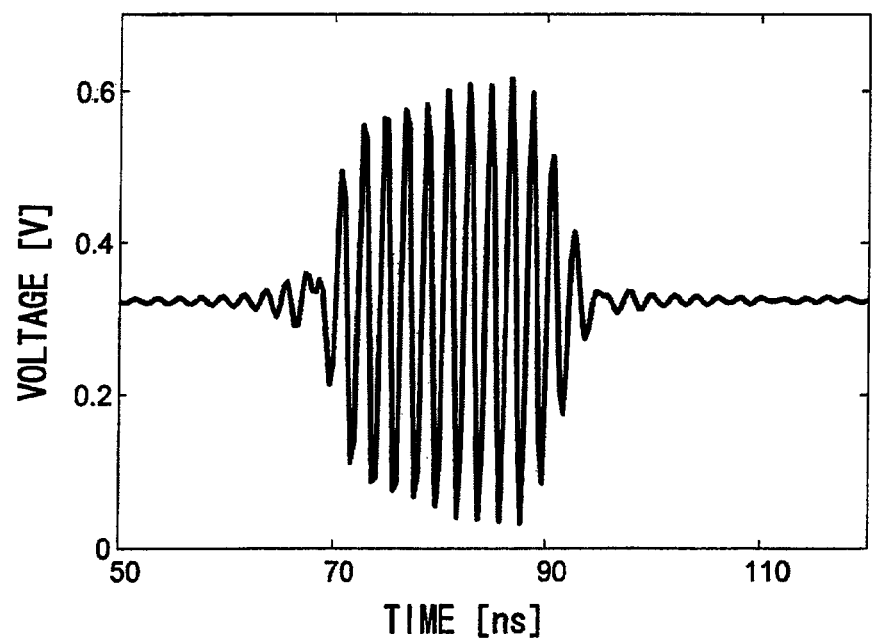
FIG. 16B shows a signal that is reconfigured after the correction is made.

FIG. 16A shows a signal that is reconfigured without performing the correction beforehand. FIG. 16B shows a signal that is reconfigured after the correction is made. In FIG. 16A, superfluous oscillation occurs at timings before 70 ns and after 95 ns, and beats occur in the signal envelope between 70 ns and 90 ns. On the other hand, in FIG. 16B, the superfluous oscillation and the beats in the signal envelope are eliminated as a result of the correction.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a detection apparatus, a calculation apparatus, a measurement apparatus, a detecting method, a calculating method, a transmission system, a program, and a recording medium for detecting a phase offset and time difference between transmission signals transmitted on different channels.

What is claimed is:

1. A detection apparatus that detects a phase alignment error between transmission signals transmitted on different channels, comprising:
   a correlation calculating section that calculates a cross-spectrum between the transmission signals based on a result of a measurement of the transmission signals transmitted in the channels, wherein the transmission signals have substantially the same spectrum at a prescribed overlapping frequency band, and are input respectively to the channels, and the correlation calculating section calculates the cross-spectrum between the transmission signals in the prescribed overlapping frequency band;
   a phase difference calculating section that calculates a phase difference spectrum between the transmission signals based on the cross-spectrum calculated by the correlation calculating section; and
   a detecting section that detects a difference between transmission times of the transmission signals transmitted on the different channels and a phase offset between the transmission signals, based on the phase difference spectrum calculated by the phase difference calculating section and comprising:
      a time difference calculating section that calculates the transmission time difference based on a slope of the phase difference spectrum; and
      a phase calculating section that calculates the phase offset based on an intercept of the phase difference spectrum.

2. The detection apparatus according to claim 1, wherein the time difference calculating section and the phase calculating section detect the transmission time difference and the phase offset based on the slope and the intercept of the phase difference spectrum, which is unwrapped by sequentially adding $2\pi$ at prescribed frequencies.

3. The detection apparatus according to claim 2, wherein the detecting section further includes a frequency bin selecting section that selects components of at least two frequency bins in the phase difference spectrum,
the frequency bin selecting section selects, from among the at least two selected frequency bin components of the phase difference spectrum, at least two frequency bins having the highest signal to noise ratio, and
the time difference calculating section and the phase calculating section calculate the slope and the intercept of the phase difference spectrum based on components of the at least two frequency bins selected by the frequency bin selecting section.

4. The detection apparatus according to claim 3, wherein the time difference calculating section calculates a number of times that $2\pi$ is added, when unwrapping the phase difference spectrum, between two prescribed frequency bins from among the at least two frequency bins selected by the frequency bin selecting section, based on components of the at least two frequency bins, and
the time difference calculating section calculates the slope of the phase difference spectrum based on the components of the two prescribed frequency bin components and the number of times that $2\pi$ is added between the two prescribed frequency bin components.

5. The detection apparatus according to claim 3, wherein with one prescribed frequency bin from among the frequency bins selected by the frequency bin selecting section as a reference, the time difference calculating section uses a least squares method to calculate (i) a number of times that $2\pi$ is added when unwrapping an other phase difference spectrum based on frequency bins that were not selected and (ii) whether the slope of the other phase difference spectrum is at a minimum value.

6. The detection apparatus according to claim 1, wherein the detecting section eliminates a frequency component having a low signal-to-noise ratio from the input phase difference spectrum.

7. The detection apparatus according to claim 1, further comprising
a measuring section that samples the transmission signal transmitted on each channel and performs a Fourier transform on sampling results of the transmission signals.

8. The detection apparatus according to claim 1, further comprising
a signal sending section that inputs, to each channel, transmission signals having spectra that are substantially the same in a prescribed overlapping frequency band.

* * * * *